Nov. 2, 1943.  B. G. DAGGETT  2,333,298
MACHINES FOR SHARPENING HAND SAWS
Filed July 31, 1940   5 Sheets-Sheet 1

Inventor
BYRON G. DAGGETT,
By Everett A. Curtis
Attorney

Nov. 2, 1943.  B. G. DAGGETT  2,333,298

MACHINES FOR SHARPENING HAND SAWS

Filed July 31, 1940  5 Sheets-Sheet 3

Inventor
BYRON G. DAGGETT,
By
Attorney

Nov. 2, 1943.  B. G. DAGGETT  2,333,298
MACHINES FOR SHARPENING HAND SAWS
Filed July 31, 1940   5 Sheets-Sheet 5

Inventor
Byron G. Daggett
By Everett N. Curtis
Attorney

Patented Nov. 2, 1943

2,333,298

UNITED STATES PATENT OFFICE 2,333,298

MACHINE FOR SHARPENING HANDSAWS

Byron G. Daggett, San Diego, Calif.

Application July 31, 1940, Serial No. 348,932

11 Claims. (Cl. 76—43)

My invention relates to machines for sharpening hand saws, particularly saws with set teeth after they have been worn to a taper or diminishing thickness under the conditions of actual use; and its objects are notwithstanding such uneven thickness to provide a more effective means than heretofore for accurately centering the saw and for preventing its being pressed out of line while its teeth are being sharpened; to advance the saw, tooth by tooth, so as accurately to register at all times with the sharpening instrument, the edges of the tooth which is being sharpened; to simplify and make more automatic the work of sharpening the teeth and to increase the speed of and effectiveness of operation; and in general to improve and render more effective the operation of sharpening hand saws.

The present application includes most or substantially all of the disclosure presented in my earlier copending application, Ser. No. 196,129, filed March 16, 1938, and entitled "Saw sharpening apparatus," and I reserve such earlier date for all common subject matter set forth and claimed herein.

Other objects will appear from the drawings, illustrating a preferred form of my invention, in which similar numerals of designation refer to similar parts throughout the several views, and in which.

Referring to the drawings, upon the base 11 is mounted the supports 12 and 13, to each of which is secured by bolts, or other suitable means, the frame 14, integral with which is the upwardly extending arm 15, provided with the socket 16. Within the opening of said socket is installed the sleeve 17, the outer wall of which is threaded to engage with the central threaded opening of the hand wheel 18, contacting with the top of said socket for the purpose of adjusting the said sleeve at various heights. As shown, the said sleeve forms a bearing for the shaft 19, the upper end of which is threaded to engage with the nut 20, separated by a collar 21 from the top of said sleeve; a dust cover 22 serving to enclose and protect the top of said shaft and adjacent parts from the ingress of dirt and grit. Securely welded or otherwise suitably secured to the lower end of the shaft 19, is the saddle 23 riding upon and firmly attached to the motor 24, upon which motor is operatively mounted in the usual manner the abrasive wheel 25.

Integral with the lower end of socket 16 is the bracket 26 (see Figure 7), to which is secured by means of bolts 27, one end of the bar 28, the other end of said bar having an opening through which protrudes the upper end of the upwardly extending elbow 29 brazed or welded at its lower end to the bracket 30 integral with the sleeve 17. Journalled in a bearing in the outer end of said bracket 30 is the upper end of the shaft 31, which is retained in operative position in said bearing by the collar 32, oscillating in the ball bearing assembly 33. As shown, the shaft 31 is constructed in two telescoping parts, the upper part of which is a cylindrical bar extending downwardly and merging into the square shaped tube 34, and the lower part of which is a cylindrical bar 35 carrying a square head 101 shaped to engage with the bore of said tube and to telescope and turn therewith.

For the purpose of cushioning the oscillations hereinafter referred to, of the motor and grinding wheel mounted thereon, I preferably provide a special form of mechanism as shown, consisting of an arm 36 welded to the lower end of shaft 19, and provided with springs 37 and connections for exerting a yielding tension upon said arm. The arm 36 rigidly carries an inverted U-shaped track 36a which freely receives a roller 36b carried by the merged ends of a pair of parallel bars 36c, the latter contacting with two flat sides of the tube 34 so as to oscillate therewith. These bars extend beyond the tube into a yoke 36d, which carries a set screw 36e by means of which the bars are clamped to a member 36f, the latter being welded at one end to the tube 34 so as to oscillate therewith. By loosening the set screw the bars 36c may be shifted longitudinally to vary the distance between the tube and the roller 36b and hence the angle of oscillation of the abrasive wheel 25.

Each spring is attached at one end to an arm 37a, of which there are two integrally joined and pivotally mounted, as shown, upon the track 36a, and at its other end to the cross-piece of a T-shaped bracket 37b which is welded to the shaft 31. The springs are always under tension, and reach their maximum tension at the end of each period of abrasive wheel oscillation.

Figures 9, 10:
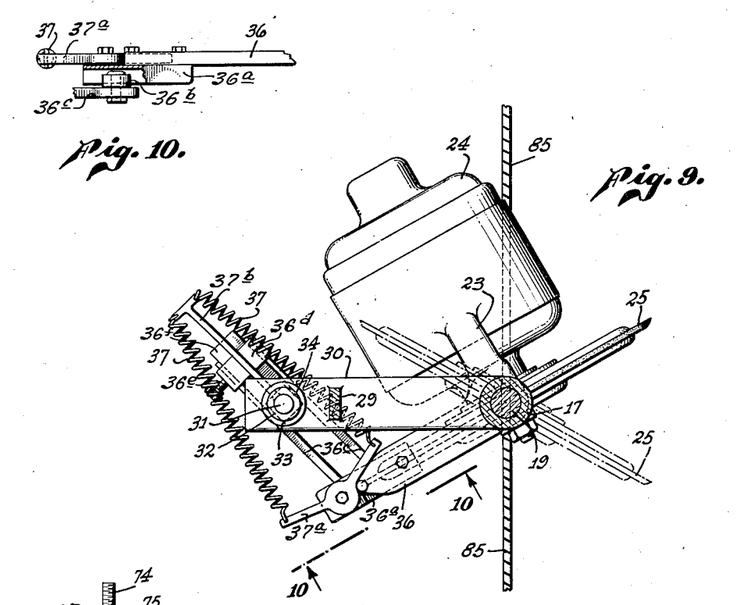
Figure 9 is a plan view illustrating the motor for operating the abrasive wheel and adjacent parts in respect to the toothed edge of the hand saw, the angular positions assumed by the wheel being shown in full or dotted lines.
Figure 10 is a detailed view of the adjustable swinging arm for moving the motor, as viewed from the position 10—10 of Figure 9.
Figure 11:
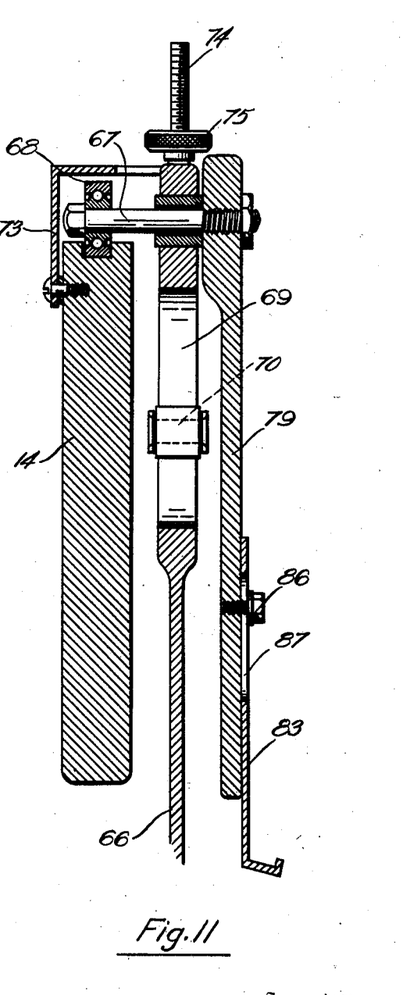
Figure 11 represents a section taken substantially on the plane of line 11—11 in Figure 4.

The parts 36b to 36f and 37b, oscillate bodily as a unit with the shaft 31 and its tube 34 about the fixed axis of the latter, and hence cause the roller 36b to ride within the track 36a, thus oscillating the latter and its supporting arm 36 about the axis of sleeve 17. In this manner the abrasive wheel may be oscillated to one of the two positions illustrated in Fig. 9. Since the arms 37a are attached to the track, varying degrees of equal tension are applied to the springs 37 during these movements, as aforestated.

Journalled within bearings in the bracket 38 on the main frame, is the lower end of the shaft 31, which protruding therethrough is secured to the arm 39 carrying the shoe 40, contacting the channels 41 of the cam pathed wheel 42, mounted on one end of the main shaft 43, journalled in suitable bearings upon the lower portion of the frame 14. On the inner end of said wheel 42, is the belt groove 44, driven by a belt 45 from the motor 46; in which groove also runs the belt 47 actuated by the pulley 48 mounted on the shaft 49 journalled in suitable bearings on the main frame and operated by the handle 50. On the end of the shaft 43 opposite to the wheel 42, is mounted an assembly of four cams 51, 52, 53 and 54. One of these cams 51, is arranged for the operation of the feeding finger 55, and contacts with the lower end of the lever 56, the upper end of which is secured to one end of the shaft 57, turning within the sleeve shaft 58, journalled in suitable bearings on the main frame 14. To the other end of shaft 57 is welded the elbow 59, the horizontal arm of which is attached to link 60, whose upper end is surrounded by a spring 61 that is in close yielding contact with the feed finger 55. Upon the extremity of the vertically extending arm of the elbow 59, is formed the catch 62, shaped to engage with link 63, mounted securely upon the end of the sleeve shaft 58 and making pivotal connection with the feed finger 55. Cast as an integral part of said link 63, is the bar 64 carrying the adjusting screw 65, the purpose of which is to adjust and limit the movement of the feed finger 55 by varying the angle through which bar 64 can oscillate in one direction to bring the lower end of the screw into contact with the frame.

Figure 6:
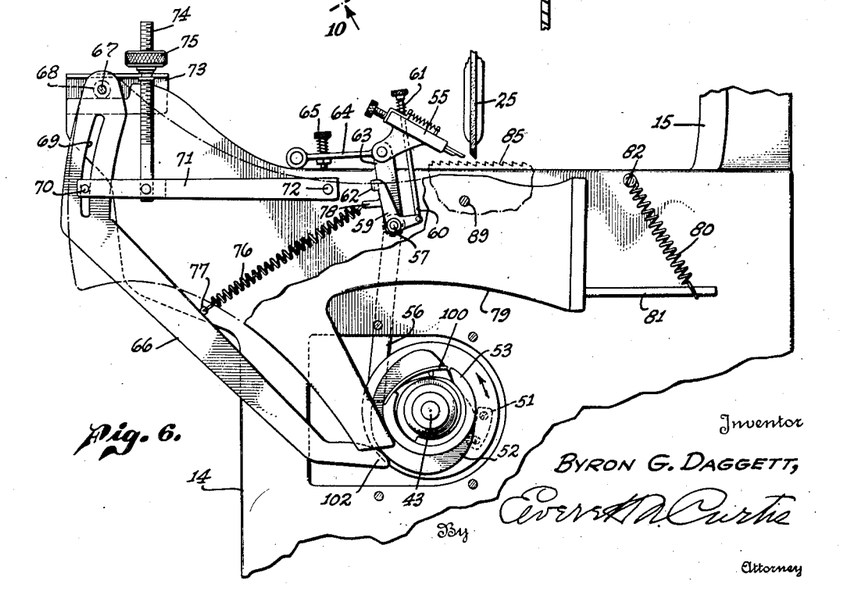
Figure 6 is an enlarged view of the operative parts shown in Figure 4.

In the position of parts illustrated in Fig. 6, the lever 56 is not engaged by the cam 51 and hence it is holding the catch 62 slightly disengaged from the arm 63, thus permitting the bellcrank 63, 64 to be pulled to the left by the spring 76 and causing the link 60 to rise slightly, with the result that the feed finger 55 is urged toward the left and held in a position of maximum counterclockwise oscillation, out of engagement with the saw teeth. When the cam 51 kicks the lower end of the lever 56 to the left (Figs. 4 and 5), said lever oscillates to cause the catch 62 to swing arm 63 clockwise and to cause link 60 to press the spring 61 against the feed finger, thus bringing the latter into engagement with the saw teeth. However, the finger 55 does not feed in the sense that it pushes the saw, for the saw is carried to the right during sharpening in a manner yet to be explained, and the finger simply prevents the saw from being returned to the left.

The cam 52, is arranged for the operation of leg 66, which is hung upon and slides upon the main frame 14, by virtue of being suspended from the shaft bolt 67 journalled in a bearing 68 sliding upon the main frame; said leg 66 being provided with an arcuate groove 69 for the reception of the pin 70, moving freely therein, and affixed to the other end of bar 71, the inner end of which is pivotally secured to the main frame 14 by means of bolt 72. Extending through an opening in the bracket 73 on the main frame is the adjusting rod 74, the lower end of which is attached to the bar 71, and the upper part of which is threaded to engage with the adjusting nut 75, serving to adjust at various heights the bar 71. To ensure close yielding contact of the foot 102 of the leg 66 with said cam 52, I provide the spring 76 leading from the screw eye 77 embedded in said leg to the eye bolt 78 in link 63, said spring further serving the purpose heretofore stated of constantly urging the bellcrank 63, 64 to the left.

Except for the adjustment afforded by the nut 75 and the slight arcuate motion that the pin 70 takes in response to rotation of cam 52, the pin 70 may be regarded in effect as a stationary frame pivot about which the leg 66 oscillates to cause the bearing 68 to roll horizontally upon a flat portion of the stationary frame. This is the only function of the leg 66, and its importance will be perceived when it is understood how this rolling movement of the bearing affects the carriage upon which the saw is mounted.

The cam 53 is arranged for the operation in part of a member 79 which is pivotally and suitably mounted upon the aforesaid bolt 67, and is yieldingly held in close contact with said cam by the spring 80 connecting the arm 81 (integral with said member) and the bolt 82 on the main frame. Adjustably secured to the member 79, is the trough 83, consisting of an elongated strip of metal with its edges turned outwardly to form a track for the reception, and sliding engagement, of the plate or carriage 84 carrying the saw 85. The saw is attached to this plate 84 adjustably by means of wing-nut clamping units 84a cooperating with vertical slots 84b in the plate. A bolt 86 engaging with slot 87 serves to attach the outer end of trough 83 to the member 79, the center of said trough being fastened to said member through the equalizing guide hereinafter described. To give further support or balance to the member 79 one or more assemblies are connected between said member and the frame as follows (see Fig. 7). A vertical pin 105 attached to the frame is connected by a tension spring 106 to a horizontal pin 107 that is connected to the member 79, thus tending to draw the latter towards the frame. A manually adjustable rod 108 is threaded through the frame to engage the member 79 and thus properly limit the extent to which the spring pulls member 79 to the left, the member 79 being slidable across that end of the rod which it contacts. The rod may be adjusted occasionally by turning it to compensate for wear between the slidably engaged parts.

Except for the horizontal movements of the pin 67, the member 79 may be regarded as having a substantially fixed pivot upon said pin, with the result that the only tendency of the cam 53 (and its cooperating spring 89) is to swing the member 79 to and fro about this pivot. Such oscillation results in an up-and-down (almost vertically arcuate) movement of the right hand end of the member 79 adjacent the cutting wheel 25. To summarize, then, the member 79 can be moved horizontally by the pin 67 in response to oscillations of the leg 66 and it can be moved substantially vertically at one end by its own cam; and when the cams 52 and 53 act simultaneously there will be produced a compounded or resultant direction of movement that follows an inclination between the horizontal and the vertical. All of these movements are rather small, but the cam surfaces are very accurately cut to produce accurate movements of the member 79. Since the latter carries the saw to be sharpened, said saw partakes of the same movements.

Figures 1, 2:
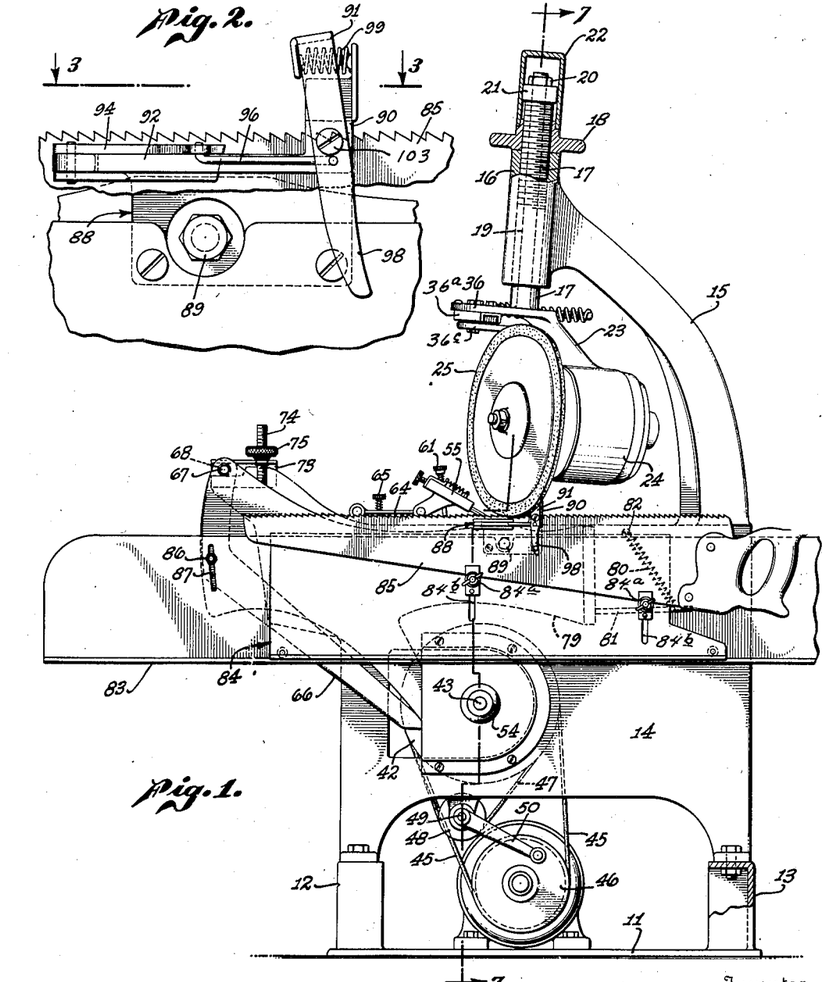
Figure 1 is a front view in elevation of my complete apparatus, showing a saw in operative position.
Figure 2 is an enlarged view of my improved equalizing guide, looking at the same from one side thereof, part of the adjacent saw being shown broken away for better illustration.
Figures 3, 5:
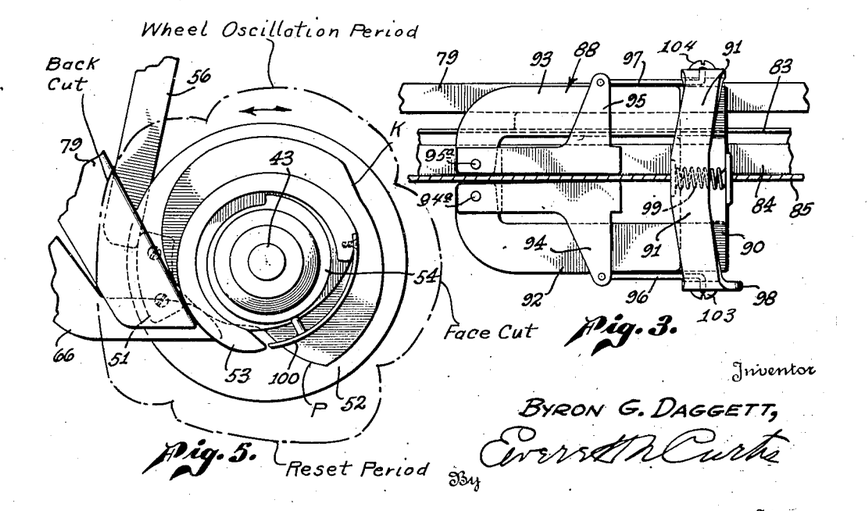
Figure 3 is an enlarged plan view of my improved equalizing guide and parts thereof adjacent to the toothed edge of the saw.
Figure 5 is an enlarged view of the cams shown in Figure 4.
Figure 4:
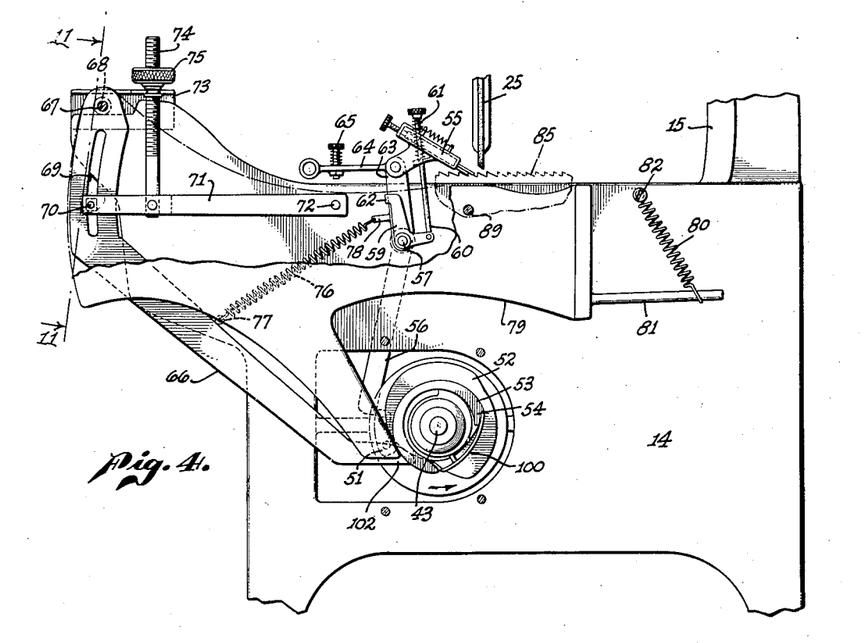
Figure 4 is a front view of the major portion of my improved apparatus, such view being slightly enlarged, and showing the said apparatus in elevation with certain parts broken away, to illustrate the construction of certain cams and other operative connections.
Figures 7, 8:
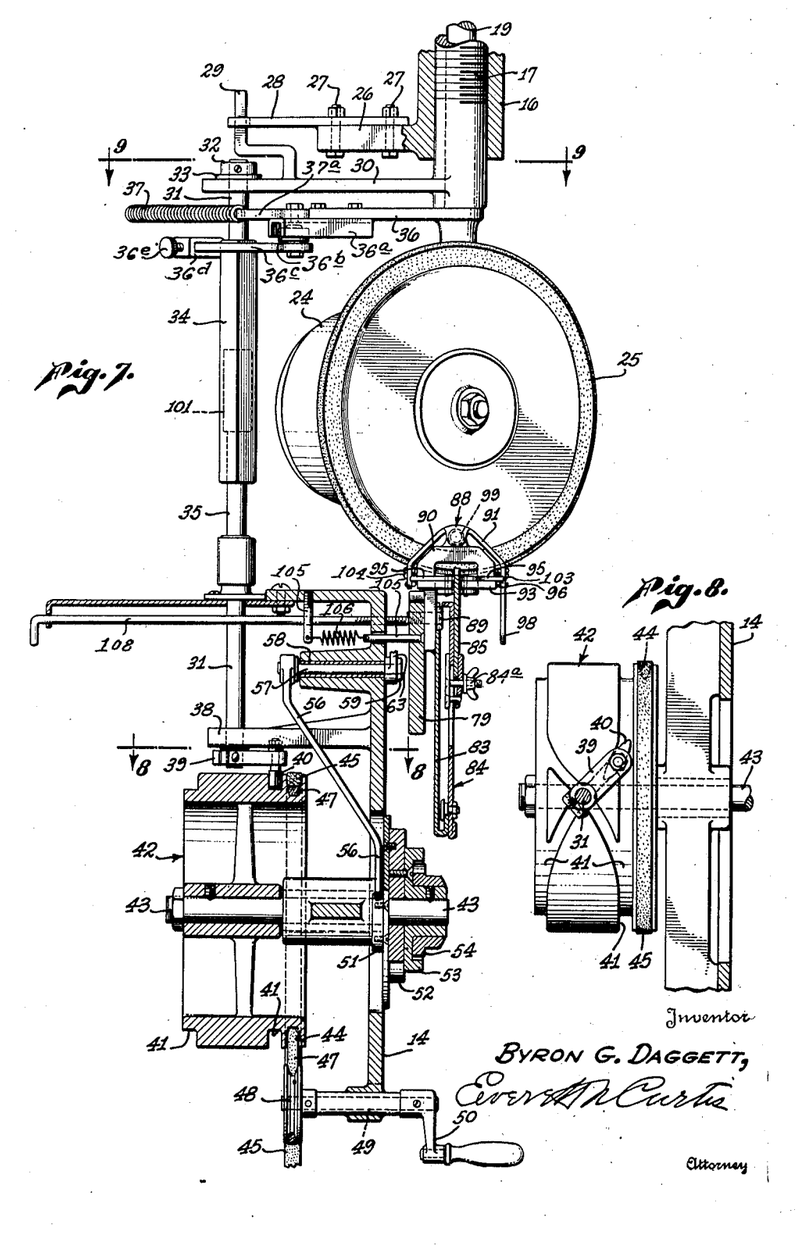
Figure 7 is a vertical section on line 7—7 of Figure 1, looking in the direction of the arrows.
Figure 8 is a view partly in section on line 8—8 of Figure 7, looking in the direction of the arrows, and illustrating the cam-pathed wheel controlling the two positions of the abrasive wheel.

The construction of the equalizing guide 88 is specifically shown in Figures 2, 3 and 7, said guide being adjustably secured to the member 79 by bolt 89, this lateral adjustment being made simultaneously with that afforded by the adjustable nut and bolt unit 86. The guide structure 88 is made up of the yoke 90, equalizing clevice 91 having its two arms pivoted to the yoke 90 by screws 103 and 104 respectively, members 92 and 93 welded to said yoke, clamps 94 and 95, astride the saw 85, and pivotally connected respectively at 94ª and 95ª to members 92 and 93, rods 96 and 97 pivotally connecting said clamps to clevice 91, release handle 98 which is a part of said clevice, and expansion spring 99, located between said clevice and yoke and operating to produce forced tension between said clamps; the pressure of said clamps upon said saw being such as to exert the greatest pressure on the side of the saw furthest outside of the central alignment or normal line of travel of the saw and to bring the saw back into said alignment, at which time the pressure exerted on each side of the saw from opposing directions will become equalized.

The cam 53 has attached thereto the hinged leaf 100, which may be adjusted in various operative positions by cam 54, as may readily be seen from inspection of Figures 5 and 7.

To operate my improved apparatus, I first clamp the saw 85 to the slide or carriage 84 with the wing-nut assemblies 84ª, and the saw is moved upon said carriage into the equalizing guide 88 so as to be accurately centered in the normal line of travel and firmly held in operative position. I then make the necessary adjustments so as to ensure the contact of the edge of the abrasive wheel 25 first with the back bevelled edge of one of the set teeth of the saw and then to make contact with the front bevelled edge of the same tooth. In making such adjustments, I consider at the outset the number of points on the saw edge of the saw and the exact interval separating each of said points from the adjacent points. I then by means of the hand wheel 18 elevate or depress the abrasive wheel 25 to the degree required by such interval. Thereafter I adjust the sleeve 17, the hinged leaf 100 on cam 53, and the feed finger 55 to conform to said interval. At the same time I adjust thumb nut 75 and cam 54 to conform with the number of points per inch of the saw. The present exposition of continued operation may be better clarified by later reference to the subsequent description of the plurality of views constituting Fig. 12. However, the general operation here set forth and then further explained in the following paragraph should give the reader an understanding of the cyclical operations of the complete machine. Upon the starting of the motors 24 and 46, the saw will be moved upwardly upon its carriage 84, and the back edge of a tooth will be brought in contact with the edge of the abrasive wheel; and thereupon the saw will be moved downwardly across said wheel edge at an angle to conform with the back edge of said tooth, and continuing its downward progress will lose contact with said wheel and occupy a lower position in respect thereto. Then upon rotation of the cam pathed wheel 42, the cam shoe 40, carried by arm 39 on shaft 31, will contact with one of the channels 41 of said wheel and will swing the abrasive wheel 25 into its other position. The saw will then be moved and upon its upward movement a like sharpening operation will be performed upon the front edge of the same tooth, and the saw thereupon moved away. Thereafter the continued automatic operation of the machine will cause the feed finger 55 to assist in advancing the saw to a successive tooth and the operation is repeated. Upon successive repetitions of the same operation all of the teeth of the saw will be sharpened, and the process of sharpening completed. If all of the saws to be sharpened have the same number of points and the same interval between points, no further adjustment will be required except to adjust the saw in proper position, and the operation of sharpening will proceed with efficiency and dispatch.

The mode of operation of member 79, to which is attached the track or trough 83, in which travels the plate or carriage carrying the saw 85, is about equally divided and motivated as between the movements of the arm 66 and the member 79 actuated by the rotative action of cams 52 and 53. While the contact end 102 of arm 66 is in neutral position in the path of the moving edge of the cam 52, that is, on the point of uniform radius on said cam where said arm 66 does not move, the edge of the cam 53 riding upon the contact end of member 79 causes the equalizing guide (attached as aforesaid to member 79) to move upwardly through the cooperating action of spring 89 and to bring the saw into rising contact with the grinding wheel 25 for the brief space of time while the said contact end of said member 79 is being passed beyond leaf 100. As soon as such passage has been accomplished, the action of said cam 53 is such as to cause the same member 79 to be lowered, and the trough 83, carrying the track, saw and carriage mounted thereon, and the equalizing guide, to be depressed away from the grinding wheel. At this juncture, the movement of parts is so timed that the cam 51 will engage with the lower end of the rod 56, the upper end of which carries feed finger 55 and which forces the same to advance slightly and to assume a rigid position. Thereupon the contact end of the arm 66 following the periphery of the cam 52 to a shorter radius, causes member 79 (and parts carried thereby) to move to the left the distance of one tooth; the saw being held rigidly in position against such movement by the feed finger 55. Such movement having been accomplished, and the arm 66 having assumed a neutral position on cam 52, the contact end of member 79 riding upon the periphery of cam 53 causes the said member 79 (carrying the saw and equalizing guide) to move upwardly and to register with the edge of grinding wheel 25 so far as possible within the gullet or space between two adjacent teeth of said saw, one of said teeth being the tooth which has just been ground as aforesaid. The machine is now in readiness to grind the back of the tooth next in order to the tooth so ground. Such grinding operation is brought about by the member 79, which just at this time is riding on cam 53 in a neutral position, and by arm 66, which is thrust downwardly by cam 52, and pivoting on bolt 70 operates to force member 79 (and parts carried thereby) to the right and downwardly while the back of said tooth is being ground. This operation completes the sharpening of the back of the tooth.

At this point, continuing the operation, cam shoe 40 comes in contact with channel 41 in cam pathed wheel 42, which causes shoe 40 to cross to the opposite side; the effect of which is to move the grinding wheel also to its opposite position, and at this time, member 79 is in position to sharpen the face of the second tooth and complete the sharpening of said tooth, member 66 now being held by spring 76 against its cam 52 in neutral position. Hinged leaf 100 on cam 53 is now ready to pass over member 79 in such position as to allow said member 79 (holding saw and equalizing guide) to move upwardly and the cutting edge of said saw to come in contact with the edge of grinding wheel 25, thereby sharpening the face of the tooth, and then being drawn downwardly through action of the cam. Such operation being completed, everything is in readiness to pass on and to grind the adjoining tooth in the same manner.

Figure 12:
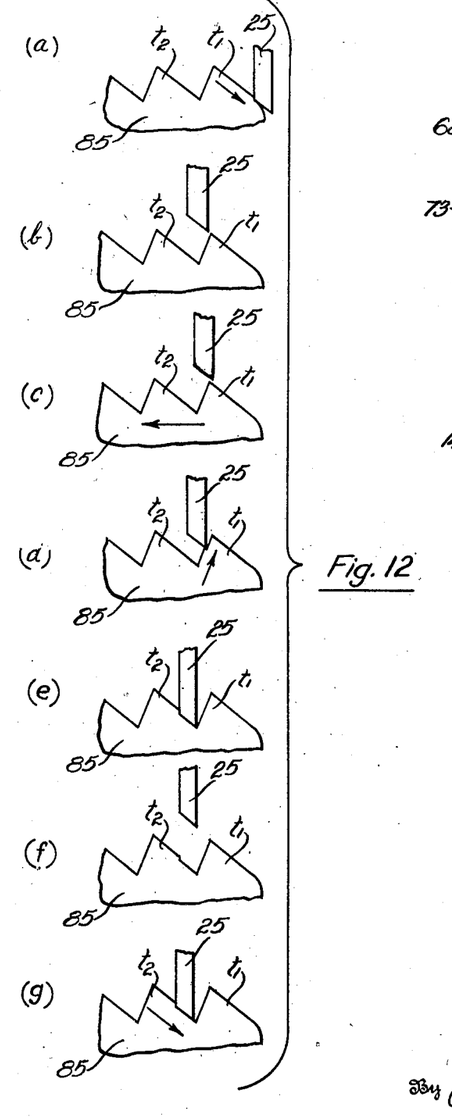
Figure 12 is a diagrammatic step-by-step showing of the movement of the saw relative to the abrasive wheel during the cutting of a complete tooth.

An understanding of the movements of the saw carriage may be further enhanced by studying Fig. 12 and the following interspersed references to the correlated positions of the set of actuating cams 51 to 54. Fig. 12 illustrates in its chronological partial views (a) to (g) the varied movements of the saw and its carriage (as a unit) and a single oscillatory movement of the abrasive wheel 25.

In the sketches of Fig. 12 it may be assumed that $t_1$ is the first or an incomplete tooth adjacent the saw handle, and that $t_2$ is the first fully cut tooth of the saw. In the view (a) the wheel 25 is rotating about one of its two selected axes while the saw and its carriage are traveling in the direction of the arrow, thus cutting the back of the tooth $t_1$. During the major part of this movement the set of cams is operating, as shown at "Back cut" (Fig. 5) to cause the lower end of lever 66 to be pushed downwardly (thus forcing the saw trough 83 to the right) and the lower tip of the arm 79 to be pushed downwardly and to the left on the true radius of cam 53 (thus causing the extreme right end of the arm to descend gradually). During the initial part of the movement the cam 51 is in action to hold the feed finger 55 towards the right to ensure travel of the saw with its carrying trough, and the jaws 94, 95 of the equalizing device are cooperating through the movement to ensure such travel of the saw.

View (b) of Fig. 12 represents the end of the back-cutting operation, in which the tooth $t_1$ has been carried slightly beyond the wheel 25. The cross-over mechanism 42 now oscillates wheel 25 to its other cutting position, during the interval designated "Wheel oscillation period" in Fig. 5. Towards the end of this period the saw and its carriage are abruptly shifted horizontally to the left, this shift being accomplished by the kick-back portion $k$ of cam 52. The parts are now in the relative positions shown in view (c) of Fig. 12, with the front face of the tooth ready to be cut.

During the following "Face cut" period (see Fig. 5), lever 66 is substantially stationary while cam 53 (including as a part thereof the adjustable hinged lead 100) permits the lower tip of arm 79 to swing generally upwardly to the right thus causing the saw to move in the direction indicated by the arrow in view (d) of Fig. 12 until it reaches the position illustrated in view (e) of that figure. During such movement it will be noted that the wheel 25 cuts partially into the back of tooth $t_2$.

There then follows a "Reset period" (Fig. 5) during which the saw trough 83 and its actuating cams and linkages readjust themselves to attain a position for beginning the cutting of the second tooth, $t_2$. During this period the saw does not move horizontally—but is first lowered until it is in the position of view (f) of Fig. 12 and is thereafter raised until it again receives the wheel 25 in the gullet between teeth $t_1$ and $t_2$—view (g) of Fig. 12, these vertical movements being accomplished by that part of cam 53 which is adjacent the free end of lead 100. Although in the interval of this same period the cam 52 has a sharply inclined surface $r$ for thrusting the saw carriage trough 83 far enough to the left to regain the position it held when the operation on tooth $t_1$ was started, the saw itself does not partake of such horizontal movement because it is engaged by the feed finger. In other words the arm 56 is riding upon cam 51 while the tip of lever 66 is riding upon surface $r$.

Continuing from this point the saw moves in the direction of the arrow in view (g) of Fig. 12 to cut the back of the tooth $t_2$ in the same manner as that of tooth $t_1$ was cut in view (a); and thereafter the mechanism proceeds to operate cyclically to cut all of the teeth of the saw.

Of great advantage in the exercise of my invention is my improved form of equalizing guide when used to sharpen the set teeth of a commercial hand saw where the same has been used by a carpenter so that the parts of the saw coming in contact with the work have become abraded and the saw has become reduced in thickness; the result being that when a hand saw so used is placed in a holder operatively arranged to move to and from the abrasive wheel, an adjustment should be made to allow for these differences in thickness in order that correct registering contact may be made with the teeth of the saw. It is for this purpose that my present form of equalizing guide is designed and constructed. I have found that to secure the proper cooperation of the abrasive wheel with the feed finger it is essential that the saw teeth coming in contact with the saw must be properly centered at all times and firmly held against lateral movement. For normal contact of the feed finger with the saw teeth, this accurate centering must be carefully preserved, for since said finger contacts each tooth, which is set at an angle, such angular impingement should at all times be maintained. If the edge of the saw be pressed out of the center of the line of feed, the edge of the abrasive wheel will not properly register with the tooth. To bring about and preserve the necessary alignment, I have found that it is essential to apply simultaneously to the saw blade, pressure coming from two opposite or contrary directions, such pressure becoming equalized when the edge of the saw is brought into the central line of travel of the saw and properly centered for operation.

My invention may be embodied in other specific forms without departing from the spirit or essential characteristics thereof. The present embodiments of my invention as hereinbefore set forth are therefore to be considered in all respects as illustrative and not restrictive, the scope of my invention being indicated by the appended claims, and all changes which come within the meaning and range of equivalency of the claims are therefore intended to be embraced therein.

What I claim and desire to secure by Letters Patent is,

1. In an apparatus for sharpening the set teeth of a saw, the combination of a frame, an abrasive wheel mounted thereon, means for causing said wheel to rotate in two angular paths conforming to the set of the saw, a carriage for said saw mounted to move upon said frame to and from said wheel, a guide for said saw mounted upon said carriage and comprising two pivotally interconnected elements pressed against opposite sides of the saw with equal pressure positively exerted from opposite directions, and co-ordinating mechanism for moving said carriage to and from said wheel to contact the teeth of said saw with said wheel.

2. In an apparatus for sharpening the set teeth of a saw, the combination of a frame, an abrasive wheel mounted thereon, means for causing said wheel to rotate on two angular paths conforming to the set of the saw, a carriage for said saw mounted to move upon said frame to and from said wheel, a guide for said saw comprising a pair of elements engageable with opposite sides of the saw and mounted movably upon said carriage, means common to said elements to press them against the saw and including resilient means for establishing equalized pressure application of said elements, and co-ordinating mechanism for moving said carriage toward and from said wheel to contact the teeth of said saw with said wheel.

3. In an apparatus for sharpening the set teeth of a saw having a blade of unequal thickness, the combination of a frame, a support shiftably connected to said frame, an abrasive wheel revolubly secured to said frame, a carriage for said saw mounted to move the same with and upon said support, mechanism connected with said support for causing the teeth of said saw to come in registering contact with the abrasive edge of said wheel, and holding and guiding means for said saw mounted upon said support, said means consisting of a pair of clamps astride said saw and each pivotally connected at one end to said support so as to maintain said one end in spaced relation to said saw, and means interconnecting the other ends of said clamps and urging them against the saw to guide and firmly to hold said saw from lateral fluctuation and to accomplish and maintain the accurate centering of said saw while it is being sharpened despite the unequal thickness of the blade of said saw.

4. In a sharpening machine of the character disclosed, a cutter, mechanism for feeding the saw longitudinally past said cutter in the general plane of the saw blade, and equalizing guide means comprising a pair of elements movable towards and from each other and engaging the two side surfaces of the saw blade, said guide means disposed adjacent the cutter and further embodying means operable upon said elements to urge them positively against said surfaces from opposite directions with equal forces and thus automatically maintain the central plane of each portion of the saw blade in a predetermined plane of travel as it passes said cutter.

5. In a machine for sharpening the set teeth of a hand saw, a power operated cutting element shiftable to two angular positions to match it with the teeth of the saw as the latter is advanced tooth by tooth, mechanism designed to advance the saw in such manner that each tooth is cut in two separate sharpening operations by said cutting element, said mechanism being retractable after each tooth is sharpened, and an equalizing guide slidably engaging the sides of the saw blade to center the latter in accurate relation to the cutting element and thus produce pairs of adjacent sharpened set teeth of equal height regardless of the thickness of the saw blade portions carrying said pairs of teeth, said guide comprising interconnected elements each free to be pressed against the saw blade in such manner as to offer substantially no resistance to advancement of the saw, and means urging said elements with equalized forces toward said blade.

6. In a saw sharpening machine, a saw carriage and operating mechanism therefor designed to feed the saw in the plane of its blade, a cutting element adjacent the carriage and shiftable to two angular cutting positions with respect to the saw, said element shaped to engage one edge of a tooth without simultaneously engaging the opposite edge of the next adjacent tooth, said operating mechanism including means designed to feed the saw in steps so that each tooth is sharpened in two separate cutting operations, applied respectively to the back and face of said tooth, and actuating means correlated with said mechanism to shift said cutting element from one position to the other at the interval between said two separate cutting operations.

7. In a saw sharpening machine, a compound linkage comprising a pair of pivotally interconnected levers, a saw carriage operable by said linkage, a set of cams associated with said levers and having certain contact surfaces, designed to produce movements of the saw carriage in directions substantially perpendicular to each other and in resultant directions representing combined components of such movements, a tooth sharpening element adjacent said saw carriage and hence in proximity to the saw teeth, and means operable by the cam set and engageable with the saw teeth and so correlated with said linkage and said cams as to cause the saw teeth to be presented to said sharpening element in such manner that the two edges of each tooth are sharpened individually, in succession.

8. A saw sharpening machine comprising a framework; a multi-part linkage mounted upon said framework; a set of cams, timed and correlated to actuate the parts of said linkage; a saw carrying device, and means for transmitting movements of said linkage to said device; a tooth-sharpening member mounted upon said framework; said linkage being designed to move said saw carrying device sequentially in several different linear directions including such as are necessary to feed the saw forwardly while shifting it into and out of engagement with said tooth-sharpening member; said cams embodying means for causing cyclical return movements of said linkage and carrying device to initial position of parts after the sharpening of each saw tooth; and mechanism for preventing return movement of the saw when said carrying device moves rearwardly.

9. In an apparatus for sharpening the set teeth of a saw having a blade of unequal thickness, the combination of a framework, a support shiftably connected to said framework, an abrasive wheel revolubly secured to said framework, a carriage for said saw mounted upon said support, mechanism connected with said support for causing the teeth of said saw to come in registering contact with said wheel, and holding and guiding means for said saw mounted upon said shiftable support and operating to accomplish and maintain the accurate centering of said saw, said means comprising a pair of elements slidably engageable with the opposite sides of the saw with capacity for movement laterally of and with the saw in either direction, and means resiliently urging said elements towards each other with substantially equal forces.

10. In an apparatus for sharpening the set teeth of a saw having a blade of unequal thickness, the combination of a framework, a support shiftably connected thereto, an adjustable abrasive wheel revolubly mounted upon said framework, mechanism connected with said wheel for rotating the same and causing it to assume two angular paths conforming to the set of said saw, a carriage for said saw mounted to move with and also upon said support, holding and guiding means upon said support operating to center said saw at all times against lateral movement, despite the unequal thickness of the blade of the same, and co-ordinating mechanism connected to said support for moving said carriage towards and from said wheel to contact the proper edge of a tooth therewith when in conforming position.

11. In a machine of the class described, a framework carrying a device for sharpening the teeth of a saw; means for mounting a saw on the framework in proximity to said sharpening device with the toothed edge of the saw free to flex laterally; mechanism for causing relative movement between said device and said mounting means to effect a progressive sharpening of the saw teeth; and means for holding and centering each portion of the toothed edge of the saw blade as its teeth are engaged by said device, said centering means comprising a pair of elements slidably and yieldingly engageable with the side surfaces of said portion of the blade, and resilient means pressing both of said elements towards the plane of the saw with substantially equalized forces.

BYRON G. DAGGETT.